A. C. SCHROEDER.
PNEUMATIC WHEEL.
APPLICATION FILED JUNE 17, 1911.
1,019,536.
Patented Mar. 5, 1912.
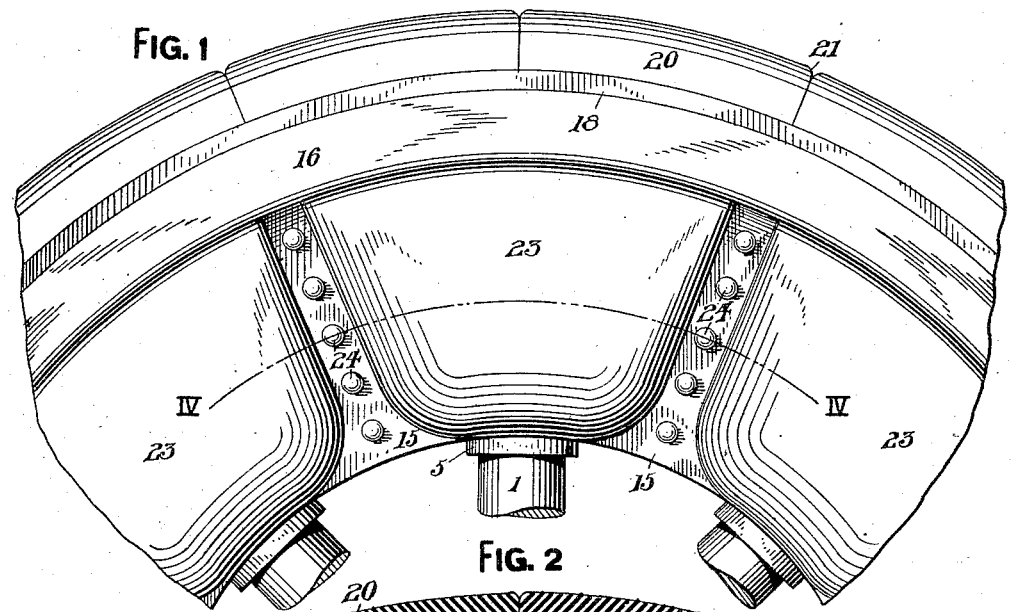
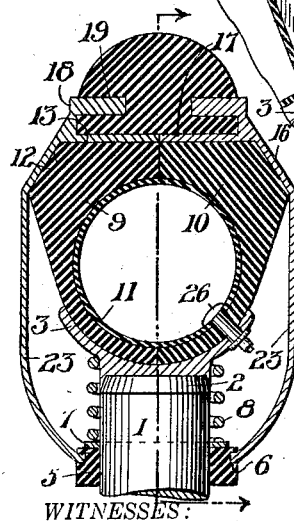
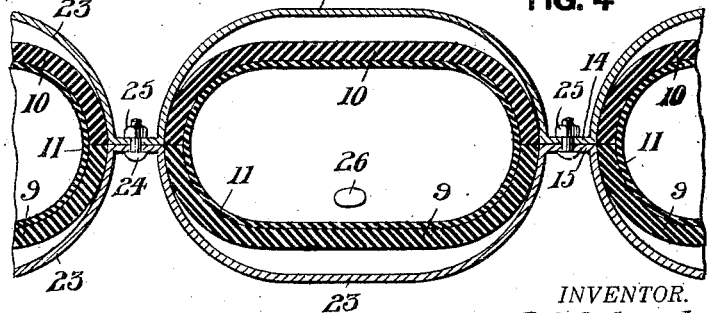
WITNESSES:
INVENTOR.
A. C. Schroeder
BY
ATTORNEYS

UNITED STATES PATENT OFFICE.

ADAM CHARLES SCHROEDER, OF DERRY STATION, PENNSYLVANIA, ASSIGNOR OF ONE-HALF TO CONRAD PROESSLER, OF PITTSBURGH, PENNSYLVANIA.

PNEUMATIC WHEEL.

1,019,536.      Specification of Letters Patent.      Patented Mar. 5, 1912.

Application filed June 17, 1911. Serial No. 633,685.

*To all whom it may concern:*

Be it known that I, ADAM CHARLES SCHROEDER, a citizen of the United States of America, residing at Derry Station, in the county of Westmoreland and State of Pennsylvania, have invented certain new and useful Improvements in Pneumatic Wheels, of which the following is a specification, reference being had therein to the accompanying drawing.

This invention relates to pneumatic wheels, and the objects of my invention are to provide a wheel of such class having separate and independent inflation compartments adapted to maintain a yieldable cushion for the tread of a tire and to provide sectional tread pieces that can be easily removed and renewed.

Other objects of my invention are to provide a pneumatic wheel that can be advantageously used in connection with motor driven vehicles, particularly those used for speeding and pleasure purposes, and to arrange a metallic reinforcement within the wheel whereby the same is practically impenetrable or puncture-proof.

Other objects of this invention are to provide an automobile wheel consisting of comparatively few parts that are arranged to provide a strong and durable structure capable of withstanding the rough usage to which it is subjected, and to furnish the tire with shields that prevent stones and sharp objects from injuring the same.

With the above and other objects in view the invention resides in the novel construction, combination and arrangement of parts to be hereinafter specifically described and then claimed.

Reference will now be had to the drawing, wherein there is illustrated a preferred embodiment of the invention, but it is to be understood that the structural elements are susceptible to such variations and modifications as fall within the scope of the appended claim.

In the drawing:—Figure 1 is a side elevation of a portion of a pneumatic wheel in accordance with this invention. Fig. 2 is a longitudinal sectional view of the same. Fig. 3 is a cross sectional view of the tire, and Fig. 4 is a horizontal sectional view taken on the line IV—IV of Fig. 1.

The reference numeral 1 denotes portions of spokes having the upper ends thereof tapered, as at 2 and the lower ends thereof connected to a hub (not shown). These parts are of the ordinary and well known construction, common to the majority of automobile wheels.

Mounted upon the tapered ends 2 of the spokes 1 are circumferentially arranged concavo-convex felly plates 2 having sockets 3 to receive the tapered ends of the spokes 1, and encircling the spokes adjacent to said plates are resilient washers 5, preferably made of rubber, each washer having a circumferentially arranged groove 6 for a purpose that will presently appear. Arranged upon each washer and encircling the spoke 1 is a metallic washer 7. Interposed between said washer and the plate 3 is a coiled compression spring 8.

Arranged upon each felly plate 3 is a sectional outer tube, comprising sections 9 and 10, said sections having the confronting faces thereof longitudinally grooved to provide clearance for an inner tube 11, said tube being cylindrical and segment-shaped in elevation. The sections of the outer tube when inclosing the inner tube are substantially keystone-shaped in cross section, said sections presenting angularly disposed surfaces 12 and flat surfaces 13. The sections 9 and 10 in horizontal section are oval and fully inclose the inner tube, as best shown in Fig. 4 of the drawing. Incasing the outer tube are circumferentially arranged shields 14 and 15 having angular side walls 16 to engage the surfaces 12 of the outer tube and flat portions 17 to engage the surfaces 13 of the outer tube, said flat portions presenting a metallic reinforcement that prevents the outer and inner tubes from being punctured or pierced.

Formed integral with the shields 14 and 15 at the meeting edges of the angular side walls 16 and the flat portions 17, are rims 18 adapted to extend into longitudinal grooves 19 provided therefor in the sides of tread pieces or blocks 20. These tread pieces or blocks are preferably made of rubber and said blocks are segment-shaped in elevation and are arranged in the end circumferentially of the outer tube. The outer end edges of the tread blocks are beveled, whereby said blocks will have an anti-skidding action when the wheel is in motion, thereby obviating the necessity of using climbers or anti-skidding device, as chains.

The shields 14 and 15 are shaped to provide oblong pockets 22, said pockets being arranged circumferentially of the wheel to inclose and shield the sections 9 and 10 of the outer tube. The shields 14 and 15 are connected together, between the pockets by bolts 24 and nuts 25, and the lower edges of the shields are cut away to embrace the washers 5, with the lower edges of the shields engaging in the grooves 6 of said washers.

In order that the inner tube can be inflated, each unit of the tube has an air inlet valve 26, the valve extending through the edge of the felly piece 3 and through the section 10 of the outer tube. Access is had to the air inlet valves 26 by removing the shields 15.

From the foregoing it will be observed that each spoke of the wheel has a felly piece, a sectional outer tube unit, an inner tube unit, a metallic reinforcement, and tread blocks, all of which contribute in the formation of the tire of the wheel and these units are protected by a shield arranged circumferentially of each side of the wheel in having pockets formed therein providing clearance for each set of units.

The tread blocks 20 are arranged in a manner that any one of the blocks can be easily removed and renewed, should it be cut by a sharp stone or piece of glass, and the construction of these blocks, particularly the beveled ends thereof, obviates the necessity of using anti-skidding chains, as the blocks obtain and form purchase upon a roadbed and increase the tractive power of the wheels of the vehicle. The flat portions 17 interposed between the tread blocks 20 and the flat surfaces of the outer tube make it practically impossible for the outer tube to be punctured or pierced, consequently the inner tube is fully protected. In making the outer tube in sections, said sections can readily adjust themselves within the pockets of the shields to compensate for any expansion or contraction of the air within the inner tube, it being a well known fact that when a high speed is obtained the inner tubes become heated, expanding the air, and in a great many instances causing the tire to burst, which very often results in an accident and a loss of life.

The resilient washers 5 are adapted to yieldably support the washers of the shield, whereby when the wheel is passing around a curve and there is a sidewise movement of the tire, the shields can readily adjust themselves, this also being true when there is a compression of the tire, in which instance the washer shifts upon the spoke, but it is immediately returned to its normal position through the medium of the spring 8.

What I claim is:—

In a pneumatic wheel, spokes, units arranged circumferentially of the outer ends of said spokes, each unit comprising a felly piece, a sectional outer tube, an inner tube inclosed by the sections of said outer tube, tread blocks, washers arranged upon said spokes, shields arranged circumferentially of said spokes and having pockets formed therein providing clearance for said outer tubes with the lower edges thereof embracing said washers and the outer edges thereof retaining said tread blocks in position relatively to said outer tubes, springs encircling the outer ends of said spokes between said washers and said felly pieces, and means inclosed by said shields to facilitate the inflating of said inner tubes.

In testimony whereof I affix my signature in the presence of two witnesses.

ADAM CHARLES SCHROEDER.

Witnesses:
 MAX H. SROLOVITZ,
 CHRISTINA T. HOOD.

---

Copies of this patent may be obtained for five cents each, by addressing the "Commissioner of Patents, Washington, D. C."